No. 754,567. PATENTED MAR. 15, 1904.
I. JACKSON.
BELT FASTENER.
APPLICATION FILED OCT. 6, 1903.
NO MODEL.
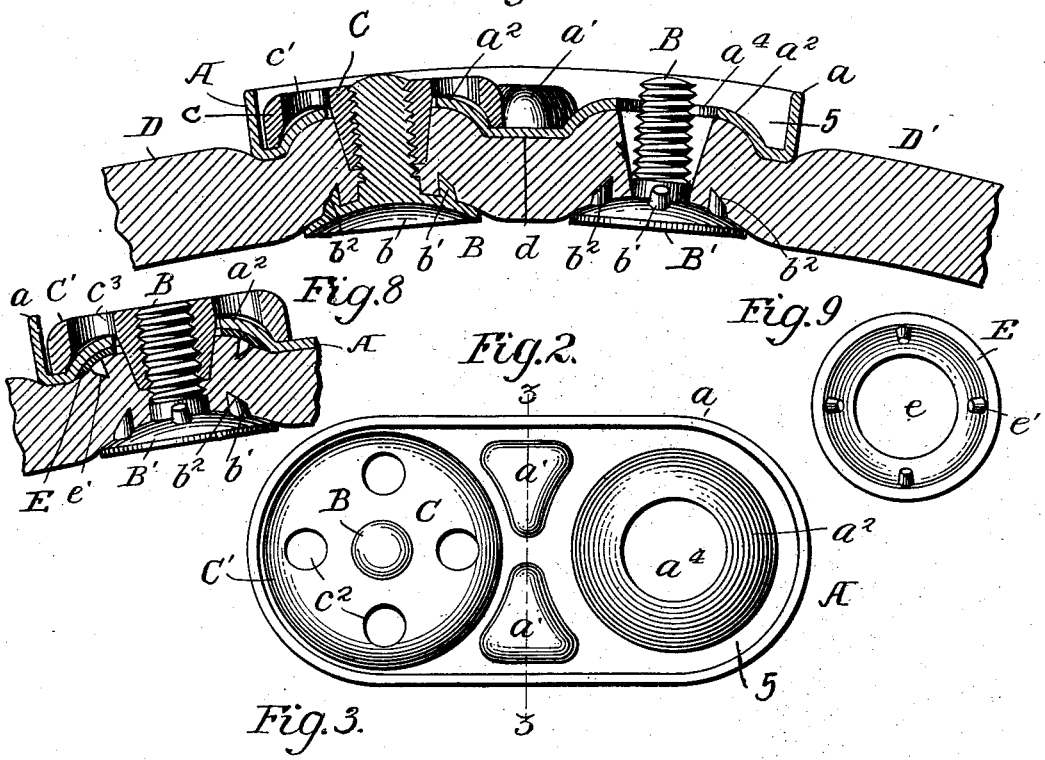
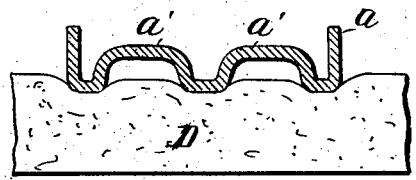
Witnesses
Inventor
Isaac Jackson
Attorneys No. 754,567. Patented March 15, 1904.

UNITED STATES PATENT OFFICE.

ISAAC JACKSON, OF GLOSSOP, ENGLAND.

BELT-FASTENER.

SPECIFICATION forming part of Letters Patent No. 754,567, dated March 15, 1904.

Application filed October 6, 1903. Serial No. 175,993. (No model.)

*To all whom it may concern:*

Be it known that I, ISAAC JACKSON, a subject of the King of England, residing at Glossop, county of Derby, England, have invented certain new and useful Improvements in Belt-Fasteners, of which the following is a specification.

My invention relates to belt-fasteners, and has for its object to provide an improved belt-fastener which shall be relatively very strong and rigid in itself, while at the same time being relatively light, as well as being of such a construction as to be capable of being readily attached to the belt or other device and to secure the parts together without injury to the belt and generally to furnish an improved means of accomplishing the purposes of belt-fasteners; and to these ends my invention consists of a belt-fastener embodying the various features of construction and arrangement of parts adapted to be used substantially in the manner and to accomplish the results hereinafter pointed out.

Referring to the accompanying drawings, wherein I have illustrated a preferred embodiment of my invention with some detailed modifications, Figure 1 is a longitudinal section of the belt-fastener shown as applied to two abutting ends of a belt, the nut at one side being omitted for purposes of clearness. Fig. 2 is a plan view of the fastener shown in Fig. 1. Fig. 3 is a rear or bottom plan view of the same. Fig. 4 is a transverse sectional view of the plate on the line 3 3, Fig. 2. Fig. 5 is a plan view of a modified shape of plate. Fig. 6 is a detail sectional view showing a modified form of flange and cup in the plate. Fig. 7 is a side view of a modified form of nut. Fig. 8 is a sectional view showing a modification including the use of a washer in connection with the plate and nuts and bolts, and Fig. 9 is a bottom plan view of the washer.

In the construction of belt-fasteners of this general class it has been common to make them of cast metal, and in order that they should be sufficiently strong it has been necessary to make them of relatively thick material, and this is especially true in regard to the central portion of the plate adjacent the abutting ends of the belt and between the openings receiving the nuts and bolts, as this is the weakest point of the fastener and the one subjected to the greatest strain.

It is one of the objects of my present invention to provide a fastener which shall overcome these objections above indicated, and, further, to so form the fastener-plate and the devices by means of which it is connected or fastened to the ends of the belt or other material that it shall furnish a substantial union between the parts with the least damage or liability to injury of the belt.

Further objects of the invention are to make the whole fastener as light as possible commensurate with its strength and to so form it and connect it to the belt that it shall project as little as practicable beyond the surface limits of the belt, and, further, so that the parts of the fastener shall be as little as possible exposed to injury from contact with extraneous objects.

With these general purposes in view I will now proceed to describe the embodiment of the invention disclosed herein.

The fastener comprises, essentially, three different members or characters of devices, one of which is the plate A, and the others, which constitute the fastening means, are the bolt B and nut C, which are used in pairs, and while I prefer to use the three members substantially in the form shown and described hereinafter together some of the features of construction herein shown and described can be used separately or in combination with the other parts of the complete device or in combination with other equivalent parts.

The plate A, which of course can vary in its contour or shape and size, according to various conditions of use, is made from sheet metal by stamping, forging, or otherwise and is as light as possible consistent with the necessary strength and rigidity, and in order to add to this strength it is provided with an upturned flange $a$, extending around its edge and of a height so that it shall preferably project even with or a little above the plane of the nut when the parts are in operative condition. This flange not only adds greatly to the strength and rigidity of the plate, and especially to the central portion thereof, but also tends to protect the nuts from injury from extraneous objects. Further, in order to provide additional rigidity and strength to the plate, and especially to the central portion thereof, the plate is formed with a number of bosses or cup-shaped depressions $a'$ $a'$, preferably projecting upward from the under side and being within the external flange of the plate, and these bosses or cup-shaped portions add greatly to the rigidity and strength of the plate without increasing its bulk or weight.

The plate is provided with a number of openings $a^4$, according to the number of fastenings used, and these openings are formed in cup-shaped projections $a^2$, and the curved sides or portions of these cup-shaped projections not only tend further to give rigidity and strength to the plate, but also provide for the reception of the material of the belt when the fastener is applied thereto, serving to make good contact and a relatively extended bearing on the surface of the belt, as will appear more fully hereinafter.

In some instances as a still further means of giving the plate strength and rigidity the upper edge of the flange $a$ may be turned inward and flattened down upon itself, as indicated at $a^3$, Fig. 6, and the inner edge of the cup-shaped projections $a^2$ can also be turned outward and flattened, as indicated at $a^6$, Fig. 6. Again, when the plate is provided with more than two openings it may have longitudinal depressions or corrugations, one of which is indicated at $a^5$, Fig. 5, and these preferably extend across the abutting edges of the belt or other device when the fastener is applied thereto.

While the plate may be used with various fastening devices, I have shown the preferred form in the drawings herewith, consisting, essentially, of a bolt B, which is preferably made of wrought metal, the head B' of which is dished or cup-shaped, as indicated at $b$, and is provided on its opposite face with a number of pins or projections $b'$, which extend practically parallel with the body of the bolt, and these pins have diagonal faces $b^2$, so that they may enter the material with a substantially chisel effect, penetrating the substance of the belt and effecting a firm hold upon the material thereof. These bolts, which are preferably formed by forging and of wrought metal, are exceedingly strong and at the same time relatively light, the cup-shaped depressions in their outer surface not only tending to this result, but also serving in use, as experience has demonstrated, as a sort of receptacle for oil or other material, so that they may be said, in effect, to form a sort of cushion between the bolt and belt to which they are attached and the pulley or other device over which the belt passes. Further, by curving the inner faces of the bolts, so as to correspond more or less closely with the curvature of the cup-shaped recesses or depressions $a^2$ of the plate, the material can be more readily compressed between the plate and bolt-head and the bolt-head sinks to a greater or less extent into the material, so that it practically does not project beyond the inner surface of the belt, and only its edges come in contact with the pulley or other device over which the belt passes.

The nut C is of course provided with a screw-thread for the bolt and is extended, so as to have a firm bearing on the bolt and preferably so as to extend to a greater or less extent through the material of belt which bears upon the outside surface of the nut, thus extending into the material. The nut is provided with a flanged head C', the under side of which is dished or cup-shaped, as at $c'$, so as to conform with more or less exactness to the cup-shaped portions $a^2$ of the plate, and it is also provided with a downward-projecting flange $c$, which forms a bearing in the recess or depression 5 around the cup-shaped projection $a^2$, and this construction further tends to add strength and rigidity to the plate of the fastener. The nut is provided with some means by which it can be readily adjusted—as, for instance, the openings $c^2$—adapted to receive a proper tool or spanner in attaching or detaching the nut, and sometimes it is desirable to provide the nut with a squared head $c^3$, as indicated in Fig. 7, as a further means of adjusting or removing the nut.

Such being the preferred construction of the parts of the belt-fastener, its manner of application in use will readily be understood, and I have shown it in Fig. 1 as applied to the two abutting ends D D' of a belt, these ends abutting at the transverse central portion of the plate, as at the line $d$. In applying the fastener to the belt the ends are perforated to receive the bolts and nuts and the plate laid thereon. The bolts are passed through the openings and connected with the nuts which extend through the openings in the cup-shaped portions of the plate. The nuts are then tightened, and in doing this the material of the belt is forced into the recesses formed in the cup-shaped portions $a^2$ of the plate, and the chisel-shaped projections $b'$ enter the material on the under side. The head of the bolt sinks into the belt to a greater or less extent, so that its outer surface is practically within the plane of the inner surface of the belt, and the belt is compressed between the head of the bolt and its projections and the cup-shaped portions $a^2$ of the plate. Further than that the material of the belt will be forced to a greater or less extent into the cup-shaped recesses in the under side of the bosses $a'$ $a'$, as indicated in Fig. 4, and all of these features tend to secure the ends of the belt to the fastener and furnish a substantial and practically rigid connection thereto and one which is the least liable to tear out or become separated, Furthermore, by the use of a plate such as described, especially in connection with the bolt shown, so that the material is compressed in the cup-shaped recesses of the plate and the plate is strengthened not only by the flange and cup-shaped portions, but by the cup-shaped portions of the nut and the corresponding curved inner surfaces of the bolt-heads, a practically rigid and very strong connection is made between the ends of the belt, and the fastener as a whole is relatively very light and substantial and can be readily attached to or detached from the belt.

While the fastener, as above described, is well adapted for many kinds of belts, when it is desired to use it in connection with a belt made of woven fabric or other material which is liable to become frayed or torn I provide washers which are adapted to fit around the openings in the belt and to be interposed between the belt and the plate A. Thus I have shown in Figs. 8 and 9 washers E, which are cup-shaped and provided with a central opening e, and on their concave faces the washers are provided with a number of pins or projections e', which are shaped similar to the projections on the head of the bolt B. In using the washers in connection with the fastener after the belt has been perforated these washers are placed upon the belt around the perforations and the plate A laid over the washers, and the nuts and bolts are then introduced as above. When the parts are secured, it will be seen that the projections enter the material of the belt around the openings and tend to prevent its becoming frayed or torn, forming, in effect, a sort of eyelet, and as these washers are curved or cup-shaped to correspond with the cup-shaped portions of the nuts and plate and with the convex portion of the bolt the material can be very securely compressed between the parts and a very substantial union effected between the belt and the belt-fastener.

Having thus described the preferred embodiment of my invention and explained its principles of construction and use, what I claim is—

1. A belt-fastener comprising a metal plate having an upwardly-projecting flange around its edge and provided with a plurality of openings, and fastening devices extending through said openings and adapted to engage the belt and secure the fastener thereto, said flange extending practically to the plane of the outer surfaces of the said fastening devices, substantially as described.

2. A belt-fastener comprising a metal plate having an upwardly-projecting flange around its edge and having bosses in the body of the plate and provided with a plurality of openings, and fastening devices extending through said openings and adapted to engage the belt and secure the fastener thereto, said flange extending practically to the plane of the outer surfaces of said fastening devices, substantially as described.

3. A belt-fastener comprising a metal plate having an upwardly-projecting flange around its edge and provided with cup-shaped projections having openings for the fastening devices, and fastening devices extending through said openings and having their outer ends extending practically to the plane of the outer edge of said flange and adapted to engage the belt and secure the fastener thereto, substantially as described.

4. In a belt-fastener, the combination with a metal plate having an upwardly-projecting flange around its edge, bosses in the body of the plate and cup-shaped projections having openings for the fastening devices, of fastening devices comprising bolts and nuts, the nuts being provided with cup-shaped flanges to fit recesses between said cup-shaped projections and said flange and bosses, substantially as described.

5. In a belt-fastener, the combination with a metal plate having an upwardly-projecting flange around its edge and cup-shaped projections having openings for the fastening devices, of fastening devices comprising bolts having cup-shaped heads and nuts provided with cup-shaped flanges, substantially as described.

6. In a belt-fastener, the combination with a metal plate having an upwardly-projecting flange around its edge and cup-shaped projections having openings for the fastening devices, of fastening devices comprising bolts having heads the inner surfaces of which are curved and nuts having cup-shaped flanges and provided with means for operating the nuts, substantially as described.

7. In a belt-fastener, the combination with a metal plate having an upwardly-projecting flange around its edge and cup-shaped projections having openings for the fastening devices, of fastening devices each comprising a bolt having a cup-shaped head, a nut having a cup-shaped flange and a cup-shaped washer, substantially as described.

8. In a belt-fastener, the combination with a metal plate having an upwardly-projecting flange around its edge and cup-shaped projections having openings for the fastening devices, of fastening devices comprising bolts having cup-shaped heads and projections on their inner surfaces, nuts having cup-shaped flanges and cup-shaped washers having projections, substantially as described.

9. In a belt-fastener, the combination with a plate having openings for the fastening devices, of fastening devices comprising bolts having projections on the inner faces of their heads, washers also having projections on their inner faces and nuts adapted to engage said bolts, substantially as described.

10. In a belt-fastener, the combination with a plate having openings for the reception of the fasteners, of washers having projections on their inner faces and interposed between the belt and plate and having corresponding openings for the fasteners, and fastening devices extending through said openings and adapted to engage the belt and secure the fastener thereto, substantially as described.

11. A belt-fastener comprising a metal plate having an upwardly-projecting flange around its edge, the edge being turned back forming a bead, cup-shaped projections having openings for the fastening devices, the edges of the projections being turned to form beads, and fastening devices extending through said openings and adapted to engage the belt and secure the fastener thereto, substantially as described.

In testimony whereof I have signed my name to this specification in the presence of two subscribing witnesses.

ISAAC JACKSON.

Witnesses:
F. L. FREEMAN,
H. M. GILLMAN, Jr.